April 30, 1963  C. E. KRAUS  3,087,348
VARIABLE SPEED-RATIO TOROIDAL TRANSMISSION
Filed March 8, 1961  6 Sheets-Sheet 5

INVENTOR.
CHARLES E. KRAUS
BY
Victor A. Behn
ATTORNEY

INVENTOR.
CHARLES E. KRAUS

ATTORNEY

United States Patent Office 3,087,348
Patented Apr. 30, 1963

3,087,348
VARIABLE SPEED-RATIO TOROIDAL
TRANSMISSION
Charles E. Kraus, Franklin Lakes, N.J., assignor to
Excelermatic, Inc., a corporation of New York
Filed Mar. 8, 1961, Ser. No. 94,188
30 Claims. (Cl. 74—200)

This invention relates to variable speed-ratio transmissions and is particularly directed to stepless variable speed-ratio transmissions of the toroidal type.

Such transmissions comprise a pair of drive members having facing toroidal or toric surfaces with a plurality of rollers (preferably three) disposed between and in friction driving contact with said surfaces and with each roller mounted for speed-ratio changing movement or precession of its axis of rotation to change the speed-ratio of the driving connection provided by the rollers between the toroidal members. A transmission of this type is disclosed in applicants copending application Serial No. 858,914, filed December 11, 1959, and now Patent No. 3,008,337.

In this type of transmission it is important to maintain the contact pressure between each roller and the two toroidal members at a value which is sufficient to prevent roller slipping and yet, for minimum wear, is not excessively higher than that required to prevent roller slipping. Accordingly, an object of this invention resides in the provision of novel means for providing adequate but not excessive contact pressure between each roller and the two toroidal members between which said roller is disposed.

It is a common expedient in toroidal transmissions to provide the roller contact pressure by mechanically loading the two toroidal members axially toward each other with a force proportional to the input torque. A torque responsive cam and sprag arrangement disposed in series with the input shaft has been used to provide such an axial loading force proportional to the input torque. In a toroidal transmission having such a mechanical arrangement for loading the transmission rollers against the toroidal members, the roller contact pressure increases promptly with increase in torque whereby sudden increases in torque do not result in roller slippage. However, it has been found that if the torque load suddenly decreases roller slippage may result even though the transmission has such a cam and sprag or other mechanical arrangement for axially loading the rollers with a force proportional to the torque. This is so because if the torque suddenly decreases, the axial loading forces on the rollers decrease equally fast but, because of inertia effects, the traction drive forces on the rollers do not decrease as rapidly and therefore roller slippage may result.

In view of the foregoing, a further object of the invention resides in the provision of means utilizing a measure of the traction drive forces on the rollers for providing roller contact pressure against the toroidal surfaces. A still further object of the invention comprises the provision of an arrangement utilizing mechanical means, such as a cam and sprag arrangement, for axially loading the rollers against the toroidal members with a force proportional to the input torque and also utilizing a measure of the traction drive forces on the rollers for loading the rollers against the toroidal members.

In the toroidal transmission disclosed in the aforementioned co-pending application, the traction drive forces on each roller are balanced against a hydraulic control force such that any unbalance between said control force and the traction drive forces on the roller causes speed-ratio-changing movement of the roller to a position in which said traction forces and hydraulic control force are again in balance. In accordance with the present invention the hydraulic pressure providing the control force balancing the traction drive forces on each roller is also used to insure maintenance of adequate contact pressure between each roller and the toroidal surfaces engaged thereby.

Several embodiments are disclosed for loading the rollers against the toroidal surfaces with a force derived from the hydraulic control pressure. In one embodiment a piston acts against, for example, the input member and this force is transmitted through a torque responsive cam and sprag arrangement for forcing the toric members axially toward each other against the rollers. In other embodiments each roller is urged along its axis of rotation into engagement with the toric surfaces with a force derived from said hydraulic control pressure. In the embodiment in which the toric members are forced axially toward each other, the actual contact pressure on the rollers depends not only on this axial force but also on the speed-ratio-position of the rollers. Accordingly, in this embodiment of the invention the ratio of said force derived from the hydraulic pressure and said hydraulic pressure is made to vary with changes in the speed ratio position of the rollers. Specifically this ratio is made to increase with change in the speed-ratio setting of the rollers toward higher output speeds.

The usual cam and sprag arrangement for axially loading the rollers between the toroidal surfaces comprises a pair of co-axial members each having a plurality of circumferentially-spaced V-shaped cam recesses facing corresponding V-shaped cam recesses in the other of said cam elements together with sprag or roller elements disposed between each facing pair of said cam recesses for transmitting torque from one cam element to the other. In the prior art such V-shaped cam recesses have had relatively sharp bottoms. With the present invention, in which a force derived from the control pressure is used in combination with a cam and sprag arrangement to load the transmission rollers against their toroidal surfaces, said force determines the loading of the rollers during steady-state operation. If, however, the torque increases suddenly, the cam and sprag arrangement provides for a more prompt increase in the contact pressure between each roller and its toric surfaces than would result in the absence of the cam and sprag arrangement. Because the steady state contact load on the rollers is determined by said control-pressure-derived force the cam sprags normally are disposed adjacent to the bottom of their respective V-shaped cam cavities. Hence, if the V-shaped cam cavities have relatively sharp bottoms rapid fluctuations in the torque input to the transmission will produce chattering of the cam and sprag arrangement as the cam-sprags oscillate across the bottoms of their respective V-shape cavities.

Another object of the invention resides in the provision of a novel cam and sprag arrangement for axially loading the toric surfaces against the rollers of a toroidal transmission which also includes means utilizing a measure of the traction drive forces of the toric surfaces on the rollers for providing each roller with contact pressure against the toroidal surfaces. In accordance with the invention the V-shaped cam cavities of the cam and sprag arrangement, incorporated in such a toroidal transmission, are each provided with a round bottom having a radius of curvature which is substantially greater than the radius of curvature of the cam sprag surface engaging said cavity so as to avoid the aforementioned cam chattering.

For satisfactory operation of the torque responsive cam and sprag arrangement for axially loading the toric members against the rollers each of the circumferentially-spaced sprags should carry the same share of the torque. Still another object of the present invention resides in the provision of a novel torque responsive cam and sprag arrangement in which each cam sprag automatically carries its share of the load.

Still another object of the invention comprises the provision of a novel and simple structure for supporting each roller in contact with the two toroidal members. Each said roller support is such that each roller can move in a manner to cause the roller to precess for changing the transmission speed ratio and preferably is such that each roller is also movable between the two toroidal members for equalizing its contact pressures on said two members.

Other objects of the invention will become apparent upon reading the annexed detailed description along with the drawing in which.

The transmission illustrated has been specifically designed for automotive use. It will be apparent, however, that the use of the transmission is not so limited and that instead the transmission is of general application.

Referring now to FIGS. 1-5 of the drawing, a transmission 10 is illustrated as comprising co-axial input and output shafts 12 and 14 respectively, input and out toroidal disc members 16 and 18 co-axially mounted on and drivably connected to the shafts 12 and 14 respectively and a plurality of circumferentially-spaced rollers 20 disposed between and in driving engagement with the toric surfaces of the disc members 16 and 18. Preferably, as illustrated, three rollers 20 are provided between the toroidal members 16 and 18. Also at least one of the toroidal disc members 16 and 18 is axially movable toward the other. For this purpose the disc member 16 is supported on the input shaft 12 for axial movement therealong.

Figure 1:
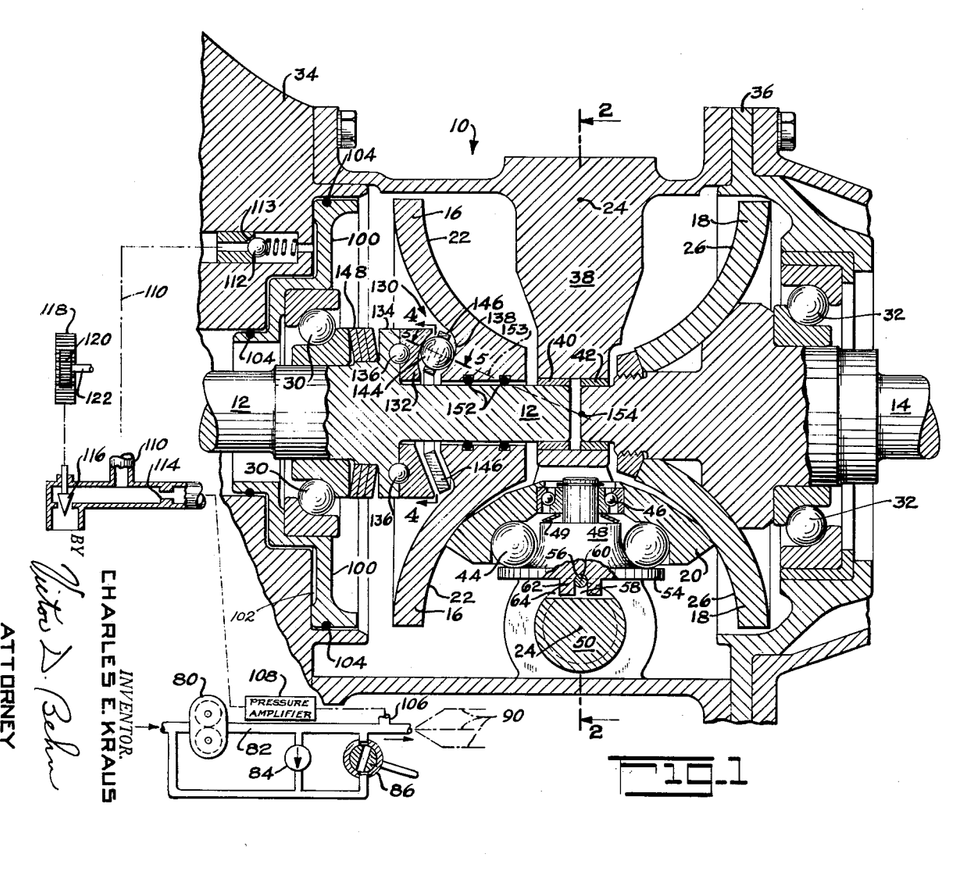
FIG. 1 is an axial sectional view through a toroidal-type transmission embodying the invention.

The input toroidal disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and having substantially the same toric center circle 24.

The shafts 12 and 14 are supported by bearings 30 and 32 in a multi-part housing including end sections 34 and 36 and an intermediate section 38 secured to said end sections. The intermediate housing section 38 is a Y-shaped frame structure between which the three rollers 20 are disposed, said Y-shaped structure providing end bearings 40 and 42 for the adacent ends of the shafts 12 and 14.

Each roller 20 is journaled by bearings 44 and 46 on a spindle 48, said bearings being designed to support its roller against radial loads and to support its roller 20 against thrust radially outward along its spindle 48, the axis of each said spindle 48 being substantially radial relative to the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is between the bearing 46 and the spindle 48 it serves to limit the thrust load carried by said bearing 46, said bearing 46 having a substantially smaller load carrying capacity than the bearing 44.

Each roller spindle 48 is supported by a pivot shaft 50 for speed-ratio-changing movement of its roller about the axis of its said pivot shaft and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus the pivot shafts 50, like the rollers 20, are circumferentially spaced about the transmission axis, there being one pivot shaft 50 for each roller.

Figures 2, 3:
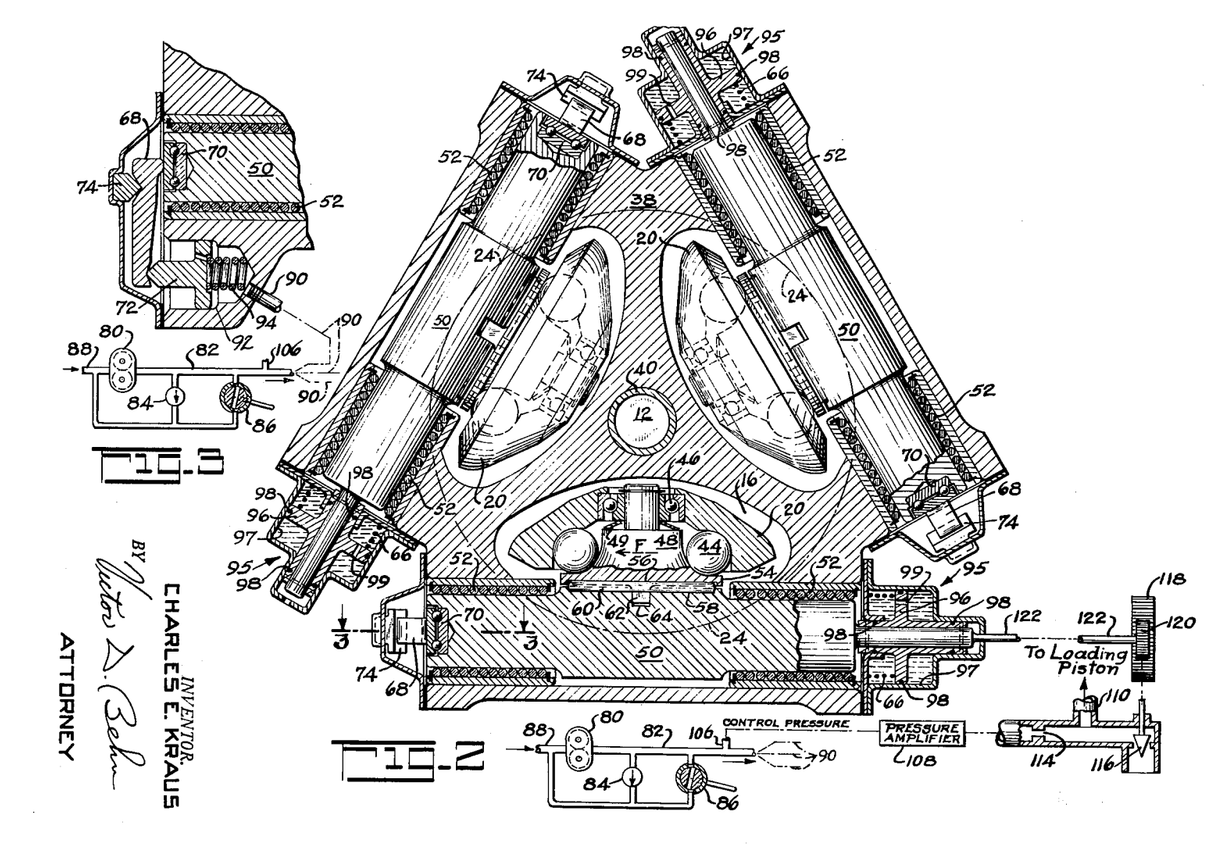
FIG. 2 is a sectional view taken along line 2—2 of FIG. 1.
FIG. 3 is a partial sectional view taken along line 3—3 of FIG. 2.

Each pivot shaft 50 is journaled in roller bearings 52 carried by the intermediate housing section 38. Each roller spindle 48 has an end plate 54 having a substantially semi-cylindrical groove 56 facing a corresponding groove 58 in the surface of an enlarged central portion of its associated pivot shaft 50. Each such semi-cylindrical groove 56 and 58 is disposed parallel to the axis of its associated pivot shaft 50. A pin 60 is received in each facing pair of grooves 56 and 58 so that thru its pin 60 the associated roller 20 is supported by the shaft 50 for speed-ratio-changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongues or lugs 62 received within a cross-slot or groove 64 in the shaft 50 so that movement of a shaft 50 along its axis results in a corresponding movement of its roller 20 in this direction. Obviously, since the cross slot 64 on each pivot shaft 50 is disposed at right angles to the adjacent pin 60, this engagement between each pivot shaft cross slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

Each pivot shaft 50 has a spring 66 urging it in one direction along its axis against a controllable force applied to the other end of said shaft by a lever 68 and a thrust bearing 70, there being one such lever 68 for each pivot shaft 50. A controllable fluid pressure (preferably hydraulic) is applied against the other end of each lever 68 by a piston 72, each lever 68 being pivotally supported intermediate its ends by a fulcrum 74. The function of the lever 68 is only to amplify the hydraulic pressure force of the piston 72 against the associated pivot shaft 50.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces on a roller and the forces along and on its pivot shaft 50 results in movement of the roller and its pivot shaft 50 along the axis of said shaft. As fully explained in the aforementioned copending application such movement of a roller 20 along the axis of its pivot shaft 50 results in precession, or speed-ratio-changing pivotal movement of the roller with and about the axis of its pivot shaft 50 to a speed-ratio position in which said forces are again in balance.

As is known, speed-ratio-changing precession of the rollers may also be produced by tilting of each roller about an axis through or parallel to a line through the points of contact of the roller with the toric members 16 and 18. As is also disclosed in said copending application, if such a roller tilt axis is offset from a line through the roller points of contact with the toric members, then the traction forces exerted by the toric members 16 and 18 on each roller apply a turning moment on the roller about its tilt axis which may be balanced by the hydraulic control force. Accordingly, it is within the scope of this invention to use such roller tilting to induce speed-ratio changing precession of the rollers instead of shifting of each roller along the axis of its pivot shaft 50.

The control pressure for controlling the speed-ratio position of the rollers 20 is supplied by a pump 80 to a conduit 82. A pressure relief valve 84 serves to limit the output pressure of the pump 80 and a controllable by-pass valve 86 serves when open to by-pass fluid from the pump output conduit 82 back to the input supply line 88 of the pump. In this way the output pressure of the pump 80 can be raised or lowered by closing or opening, respectively, the by-pass valve 86.

The control pressure or output line 82 of the pump 80 is connected by a conduit 90 to a cylinder 92 for each piston 72, there being one line 90 for each roller 20. The arrangement is such that the control pressure supplied to each cylinder 92 acts against its piston 72 whereby said piston through its lever 68 acts on the associated pivot shaft 50 to oppose the spring 66 and the traction forces F on the associated roller. A spring 94 is also provided to maintain the piston 72, lever 68 and shaft 50 in contact with each other. With this arrangement each roller 20 automatically and independently of the other rollers moves to a speed-ratio-position in which the traction forces on said roller, the hydraulic control pressure force exerted and the forces of the springs 66 and 94 are in balance. The magnitude of the forces of the springs 66 and 94 on the associated pivot shaft 50 is small compared to that of the hydraulic control force and traction forces. Also, because the range of movement of each pivot shaft 50 along its axis is small the forces of the springs 66 and 94 thereon are substantially constant.

The end of each roller pivot shaft 50 remote from the control pressure lever 68 is provided with a fluid dash pot device 95 for damping precession inducing movements of the associated roller. For this purpose each said shaft end has a piston-like member 96 slidable within a cylindrical space 97 containing a damping fluid such as a high viscosity silicone oil. Seals 98 serve to seal the silicone oil within the space 97 and the piston 96 has a restricted opening 99 therethrough. With this construction each device 96 serves to damp vibrations of its associated roller in a direction parallel to the axis of its pivot shaft 50. The details of this structure of the damping devices 95 form no part of the present invention.

As is apparent the input and output shaft bearings 30 and 32 are designed to carry axial thrust loads as well as radial loads. An annular piston 100 is co-axially disposed about the input shaft 12 between the outer race of the bearing 30 and housing end section 34. The piston 100 is fitted within the housing end section 34 to form an annular cylindrical space 102 to which is supplied a fluid pressure derived from the controlled pressure in the output line 82 of the pump 80. The annular cylindrical space 102 is sealed by seals 104.

The fluid pressure behind the piston 100 is supplied from the conduit 82 through a conduit 106, a suitable pressure amplifier 108, a conduit 110 and a check valve 112. The check valve 112 is designed to open wide when fluid under pressure flows into the cylindrical space 102 so as to offer little or no restriction to such flow. However, when fluid tends to flow out of the space 102, the check valve closes except for a restricted by-pass passage 113 whereby the pressure on the piston 100 can only decrease slowly but it can increase relatively quickly. The pressure amplifier serves to provide a pressure in the line 110 which is proportionately higher than that in the line 106 and conduit 82. The pressure amplifier may be of any conventional design and is only provided to reduce the required size of the piston 100.

The fluid pressure supply line 110 also includes a restriction 114 and a variable bleed valve 116 so that the proportionality ratio of the pressure in line 82 and that in the line 110 downstream of the restriction 114 can be varied by opening or closing the bleed valve 116. For this purpose the bleed valve 116 is connected to a rack 118 and a pinion 120 meshing with the rack is connected by a shaft 122 to any one of the pivot shafts 50 so as to be rotatable therewith. The pressure of the fluid supplied to piston 100 is thus derived from the control pressure in line 82 but the ratio of the pressure acting on the piston 100 to said control pressure depends on the setting of the bleed valve 116.

Figures 4, 5, 8, 9:
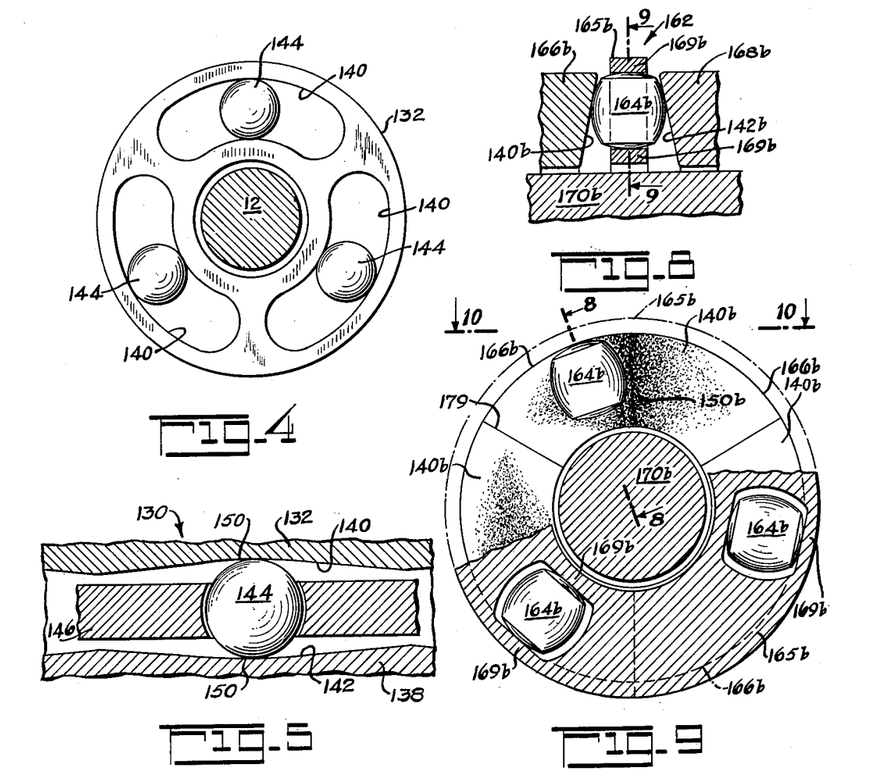
FIG. 4 is a transverse sectional view taken along line 4—4 of FIG. 1 with the sprag cage omitted for reasons of clarity.
FIG. 5 is a developed sectional view taken along line 5—5 of FIG. 1
FIG. 8 is an enlarged view in axial section of a modified cam and sprag device said figure being taken along the radial plane indicated by line 8—8 of FIG. 9.
FIG. 9 is a view taken along line 9—9 of FIG. 8.

A cam and sprag device 130 is provided between the input shaft 12 and the relatively movable input toroidal disc 16. The device 130 comprises an annular cam member 132 which is keyed to a shoulder 134 on the input shaft 12 by a plurality of balls 136 received in facing semispherical pockets in said shoulder and cam member. The cam and sprag device 130 also includes an annular cam portion 138 on the input toroidal disc with said cam portion having a plurality (preferably three) of circumferentially-spaced V-shaped cam recesses 140 each of which having a V-shaped bottom and facing a corresponding V-shaped cam recess 142 on the cam member 132. A sprag 144, which as illustrated in FIG. 1 may be in the form of a ball, is received within each facing pair of cam recesses 140 and 142. A cage 146, shown in FIG. 5, is also provided for the sprags 144.

As already stated, the input toroidal disc member 16 is axially movable toward and away from the disc member 18. A Belleville washer type spring 148 acts through the cam and sprag device 130 for axially urging the movable disc member 16 toward the disc member 18 to squeeze the rollers 20 there between. The spring 148 thereby provides the initial contact pressure or pre-load of the rollers 20 against the toroidal disc members 16 and 18. Upon application of torque to the input shaft 12, the cam member 132 rotates relative to the cam portion 138 of the toroidal disc 16 to wedge the sprags 144 therebetween for transmitting said torque thereby axially urging the toroidal discs 16 and 18 toward each other against the rollers 20. The axial reaction of the cam member 132 is transmitted through the input shaft shoulder 134, spring 148, bearing 30, piston 100 and fluid pressure in the space 102 to the housing end portion 34.

If it is assumed for the moment that the piston 100 is bottomed against the adjacent housing end portion 34, then the cam and sprag device 130 axially loads the toroidal discs against the rollers with a force proportional to the input torque.

Actually, however, the apparatus is designed so that under steady state conditions the axial force exerted by the piston 100 is greater than that exerted by the cam and sprag device 130. Therefore, the piston 100 is not bottomed and the axial force exerted by the toroidal discs 16 and 18 against the rollers 20 is equal to that provided by the piston 100. If the input torque should now suddenly increase the cam and sprag device 130 will immediately respond to produce a proportionate increase in the axial loading of the rollers 20 between the toroidal discs 16 and 18. In this way the cam and sprag device 130 automatically and promptly increases the axial loading of the toroidal discs 16 and 18 against the rollers 20 to prevent slippage of said rollers as a result of said torque increase. The steady state axial loading of said rollers is however determined by the hydraulic pressure against the piston 100.

If the input torque should suddenly decrease the cam and sprag device 130 by itself would tend to unload the axial pressure on the rollers 20. However, the hydraulically loaded piston 100 prevents the cam and sprag device 130 from so unloading the rollers 20. This is important in order to prevent roller slippage because as a result of inertia effects the traction forces on the rollers do not decrease as fast as the input torque.

As used herein "high-speed-ratio position" of the rollers refers to the roller positions for relatively high speed but low torque of the output shaft 14 and "low-speed-ratio position" of the rollers refers to the roller positions for relatively low speed but high torque of the output shaft.

In the low-speed-ratio position of the rollers 20, the roller 20, illustrated in FIG. 1, will have rotated to its extreme clockwise position and in its high speed ratio position said roller will have rotated to its extreme counterclockwise position. Thus at the low-speed-ratio position of a roller the contact pressure of the input toroidal disc 16 against a roller 20 makes a substantially larger angle to the transmission axis than said pressure does in the high-speed-ratio position of the roller. Accordingly in the low-speed-ratio position of the rollers 20 a given axial pressure against the rollers 20 produces a greater contact pressure of the toroidal discs 16 and 18 against the rollers than in the high speed ratio position of the rollers.

In order to compensate for this change in the angle of the contact pressure of the input toroidal disc 16 against the rollers as the speed-ratio-position of the rollers is changed, the position of the bleed valve 116 controlling the pressure behind the piston 100 is varied with changes in the roller speed-ratio positions. For this purpose the connection including the rack 118, pinion 120 and shaft 122 of the bleed valve 116 to the pivot shaft 50 of one of the rollers 20 is such that when the rollers are in their high-speed-ratio positions the valve 116 is in its minimum open position and when the rollers 20 are in their low-speed ratio positions the valve 116 is in its maximum open position. Hence, the ratio of the axial pressure force exerted by the piston 100 to the control pressure in the line 82 is high when the rollers 20 are in their high-speed-ratio positions and is low when the rollers are in their low-speed-ratio positions. At this point it should be recalled that each roller automatically moves to a speed-ratio-position in which but for the small and substantially constant forces of the springs 66 and 94 the hydraulic control pressure force on its pivot shaft balances the traction forces on said roller.

Since under steady state conditions the pressure exerted by the piston 100 is greater than the axial torque reaction force produced by the cam and sprag device 130 the cam sprags or roller elements 144 normally will be positioned adjacent to the bottoms of their respective V-shaped cam recesses as illustrated in FIG. 5. If the bottom of each V-shaped cam recess 140 and 142 is provided with a sharp apex, then since the cam sprags or roller elements 144, are positioned adjacent to the bottoms of said cam recesses sudden torque changes would cause the cam sprags or roller elements 144 to chatter from one side to the other of said cam recesses. To avoid such cam chattering the bottom of each cam recess is rounded as indicated at 150 with the radius of curvature of each said rounded cam bottom being greater than the radius of curvature of the portion of the sprag 144 engaging said cam bottom. Preferably the radius of curvature of each round cam bottom is several times that of the surface of the sprag engageable with said bottom.

In order to insure equality of pressure of the toroidal discs 16 and 18 against the plurality of rollers 20 notwithstanding manufacturing tolerances in the dimensions of said rollers and discs, three such rollers are provided and in addition one of the discs, for example the disc 16 as illustrated, is supported for limited tilting movement relative to the input shaft 12. For this purpose the input disc 16 is supported so that it can rock or tilt on the cam sprags 144. To facilitate this tilting freedom of the input toroidal disc 16, rubber-like bushings 152 are provided between said disc and the input shaft 12 and the cam and sprag device 130 is designed so that a line 153 through the points of contact of each sprag 144 with the cam member 132 and cam portion 138 intersects the corresponding lines for the other sprags 144 on the transmission axis preferably at a point 154 approximately midway between the toroidal discs 16 and 18. With this tilting freedom of the input toroidal disc 16, said disc automatically tilts on the cam sprags or rollers 144 relative to the shaft 12 so as to exert equal contact pressure against the three rollers 20. In addition, as already described, each roller support pin 60 provides for limited tilting of each roller about said pin to equalize the contact pressures of the two toroidal discs 16 and 18 against said roller.

It is apparent now that the cam sprags 144 perform two functions. First, they founction to axially load the toroidal discs 16 and 18 against the rollers with increases in the input torque. Second, they provide the input toroidal disc 16 with a tilting freedom to insure equal contact pressure of said disc against the rollers 20.

It should also be noted that since the input shaft 12 is journaled in a bearing 30 carried by the piston 100, said piston necessarily has a limited radial freedom of movement in its cylindrical space 102 whereby said bearing and piston provide a flexible support for the shaft 12. The flexibility of the support for the shaft 12 permits said shaft and its input toroidal disc 16 to deflect slightly for equalizing the contact pressures of the toroidal disc 16 against the rollers 20. This latter flexibility of the input toroidal disc 16 is in addition to that provided by the sprags 144 as already described.

Figure 6:
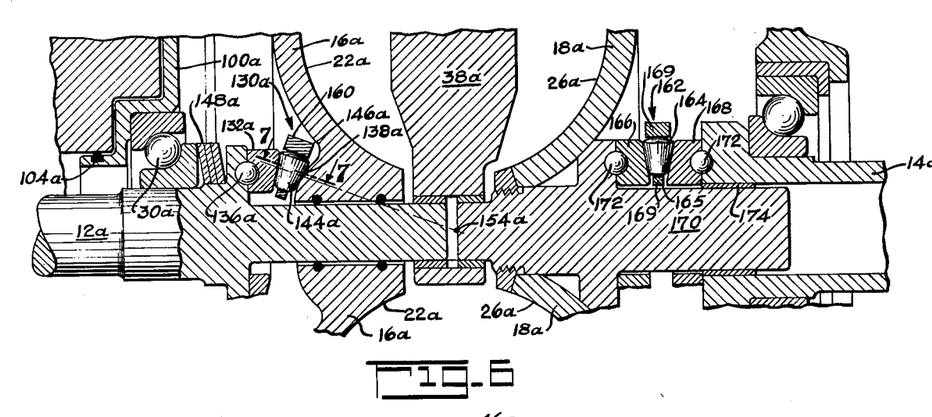
FIG. 6 is an axial sectional view through a toroidal transmission having a modified form of torque responsive cam and sprag structure.
Figures 7, 10:
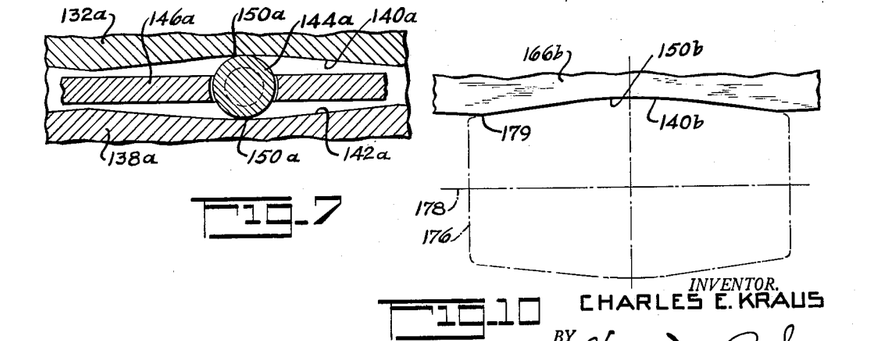
FIG. 7 is a developed sectional view taken along line 7—7 of FIG. 6
FIG. 10 is a view of a cam member taken along line 10—10 of FIG. 9 and illustrating a grinding wheel in position for grinding a cam recess.

It obviously is desirable that the cam sprags 144 of FIGS. 1–5 divide the torque load equally between. FIGS. 6 and 7 illustrate a toroidal transmission having a modified cam and sprag device for axially loading the toroidal discs against the transmission rollers in response to an increase in the input torque such that the load is automatically divided equally between the cam sprags. The transmission of FIGS. 6 and 7 also differs from that of FIGS. 1–5 in that a cam and sprag torque loading device is provided on the output side of the transmission as well as on the input side. The transmission of FIGS. 6 and 7 is otherwise like that of FIGS. 1–5 and, for ease of understanding, the parts of FIGS. 6 and 7, corresponding to parts of FIGS. 1–5, have been designated by the same reference numerals but with a subscript *a* added thereto.

In FIGS. 6 and 7, the cam-sprag device 130*a*, between the input shaft 12*a* and the input toroidal disc 16*a*, has a plurality of circumferentially-spaced generally conical-shaped sprags or roller elements 144*a*. Preferably each sprag 144*a* is received between a facing pair of V-shaped cam recesses 140*a* and 142*a* in the cam member 132*a* and in the input toroidal disc cam portion 138*a* respectively. As illustrated, each sprag 144a is a truncated cone with its apex on the transmission axis so that pure rolling takes place between each conical sprag 144a and the cam member 132a and the cam portion 138a. The conical sprags 144a are held in equal circumferential spacing, each in a facing pair of V-shaped cam recesses 140a and 142a, by a floating cage 146a having portions 160 engaging the radially inner and outer bases of conical sprags 144a. As in the case of the V-shaped cam recesses 140 and 142, the bottom of each recess 140a and 142a is rounded as indicated at 150a and each portion of said round bottom has a radius of curvature which is substantially larger than the radius of curvature of the surface portion of the cam sprag or roller element 144a engageable with said round bottom portion.

With this construction of the cam and sprag device 130a, each conical sprag or roller element 144a is urged radially outwardly with a force proportional to the load transmitted by said sprag. Accordingly, if one sprag 144a carries more than its share of the load it will shift radially outwardly to decrease the load thereon. This radially outward shift of said one sprag 144a shifts the floating cage 146a to move the other two sprags radially inwardly to increase the load thereon. In this way the floating cage 146a automatically shifts radially to maintain the sprags 144a in position in which they carry equal shares of the load. Obviously instead of the cage 146a with its sprags 144a being floatingly supported for radial movement to equalize the load on the sprags, said cage could be piloted against radial movement, for example on the adjacent shaft 12a, and the cam member 132a could be supported for radial movement to equalize the load on the cam sprags.

As illustrated, each cam recess 142a in the cam portion 138a is convex when viewed in a radially plane to provide for tilting of the input toroidal disc 16a about the conical sprags 144a thereby insuring equal contact pressure of the input disc 16a against the rollers 20a. Furthermore, the axis of each conical sprag 144a preferably is inclined to the transmission axis, as illustrated, so that a normal to contacting surface portions of each conical sprag 144a and the cam portion 138a intersects the transmission axis at the same point 154a as the corresponding normals for each of the other conical sprags 144a.

In the case of an automotive vehicle traveling, for example, over a bumpy road the output torque of its transmission is subject to sudden changes. For example, when the rear wheels of the vehicle hit a severe bump in the road they momentarily leave the road and when they return and strike the road a large torque impulse is suddenly imposed on the output side of the transmission. For this reason it is now considered desirable in the case of an automotive transmission to add a second cam and sprag device on the output side of the transmission to increase the axial loading of the transmission rollers between the toroidal surfaces when there is a sudden increase in the output torque load.

FIG. 6 illustrates such a second cam and sprag device 162 in the output side of the transmission. Obviously, the transmission of FIGS. 1-5 may also be provided with a second cam and sprag device in its output side. The cam and sprag device 162 preferably is like the cam and sprag device 130a in that it has conical-shaped sprags 164, said sprags being disposed within a floating cage 165 between cam members 166 and 168. Like the cage 146a, the cage 165 has portions 169 engaging the radially inner and outer bases of the conical sprags 164 for equalizing the load carried by said sprags. The cam members 166 and 168 have V-shaped cam recesses corresponding to the V-shaped cam recesses 140a and 142a of the cam and sprag device 130a. For pure rolling on their cam surfaces, each conical sprag 164 like the conical sprags 144a, has its apex disposed on the axis of the transmission. Also, since no tilting of the output toroidal disc 14a is required, the profiles of the cam recesses in both cam members 166 and 168 and the sides of the sprags 164 are straight in planes including the transmission axis. In addition, the axis of each sprag 164 is perpendicular to the transmission axis instead of being inclined thereto like the axis of each sprag 144a.

The cam member 166 is keyed to an intermediate shaft 170 by balls 172 received in facing semi-spherical pockets in said cam member and in a flange on said shaft. The cam member 168 is similarly keyed to the output shaft 14a. The output toroidal disc 18a is secured to the intermediate shaft 170 which in turn is slidably journaled in the adjacent hollow end of the output shaft 14a by a bushing 174.

With the addition of the cam and sprag device 162 on the output side of the transmission, a sudden increase in the output torque serves to increase the axial loading of the toroidal discs 16a and 18a toward each other to prevent slippage of the rollers 20a under such operating conditions.

Instead of the spherical sprags 144 of FIGS. 1-5 or the conical sprags 144a or 164 of FIGS. 6-7, said sprags may be barrel shaped. Such a modification is illustrated in FIGS. 8-10. For ease of understanding the parts of FIGS. 8-10 have been designated by the same reference numerals but with a subscript b and for purposes of illustration the barrel shaped sprags of FIGS. 8-10 have been substituted for the conical sprags 164 of FIGS. 6-7. Obviously the sprags 144 or 144a may also be made barrel shaped.

In the modification of FIGS. 8-10, the circumferentially-spaced barrel-shaped sprags 164b are disposed between cam members 166b and 168b of a cam and sprag device 162b, said cam members having facing circumferentially-spaced V-shaped cam recesses 140b and 142b between which said sprags are disposed. Preferably the profile of each cam recess 140b is such that its bottom or apex is a line which is radial relative to the transmission axis and said cam recess has a profile which is generated by said line moving parallel to itself. Thus, as schematically indicated in FIG. 10, the cam recess 140b may be formed by a cutter or grinding wheel 176 as its axis 178 moves radially inwardly toward the transmission axis, said cutter axis 178 being spaced from and disposed at right angles to the transmission axis. The lines 179 indicate the junctions of the cam recesses 140b. Each cam recess 142b in the cam member 168b preferably is formed and shaped in a manner similar to the cam recesses 150b.

During normal operating conditions, the sprags 164b are displaced from the bottom of their cam recesses as illustrated in FIG. 9. With the cam recesses 140b and 142b formed in the above described manner and when the cam sprags 164b are displaced relative to the bottom of their respective cam recesses, then in a plane including the transmission axis and an axis of a sprag 164b the sides of the recesses 140b and 142b of the cam members taper toward each other in a radially outward direction, as shown in FIG. 8. As a result of this outward taper, the axial pressure of the cam members 166b and 168b against the barrel-shaped sprags 164b has a component which urges the sprags 164b radially inwardly. The sprags 164b are held in circumferentially-spaced relation by a floating cage 165b. The floating cage 165b has portions 169b engageable with the ends of the sprags 164b so that if one of the sprags 164b carries more than its share of the load it will shift radially inwardly to decrease the load thereon and at the same time the floating cage 165b will shift with said one sprag to move the other sprags radially outwardly to increase the load thereon. It is apparent therefore that this floating cage 165b automatically shifts the sprags 164b so that they carry equal shares of the load.

In the embodiments so far described the piston 109 causes the toroidal discs 16 and 18 to exert an axial force against the rollers 20, said axial force being derived from the hydraulic control pressure acting on each roller for controlling its speed-ratio position. Also, as described, since the contact pressure between each roller and the toroidal discs depends not only on the magnitude of said axial force but also on the speed-ratio position of the roller, the bleed valve 116 is movable so that the proportionality ratio of said axial forces to said hydraulic control pressure increases with increase in the speed-ratio setting of the rollers 20.

Figure 11:
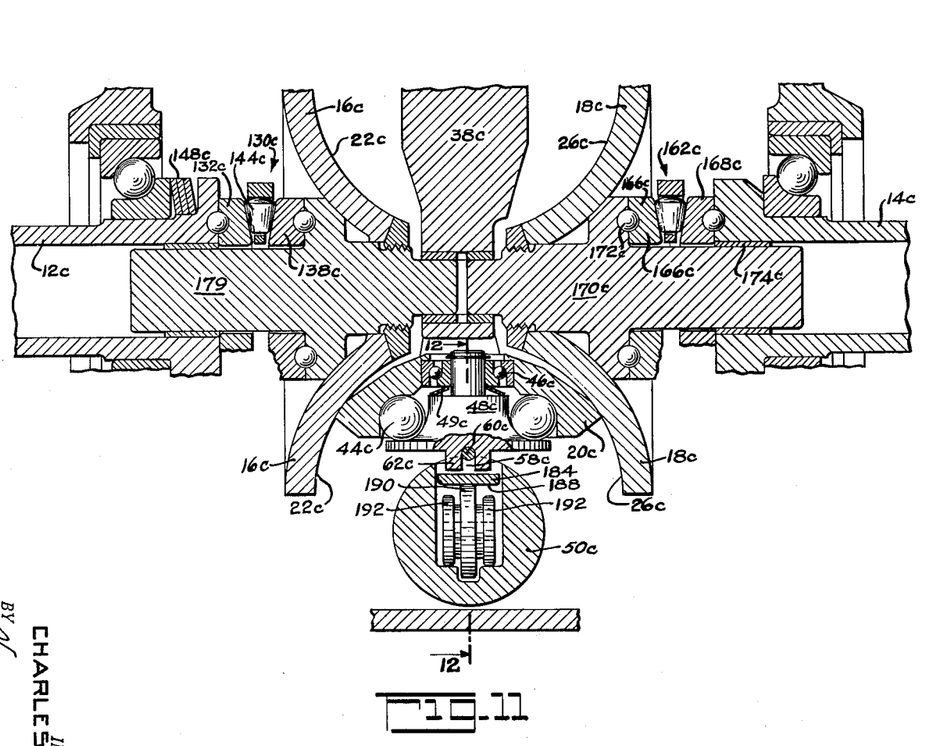
FIG. 11 is an axial sectional view through a further modified toroidal transmission.
Figure 12:
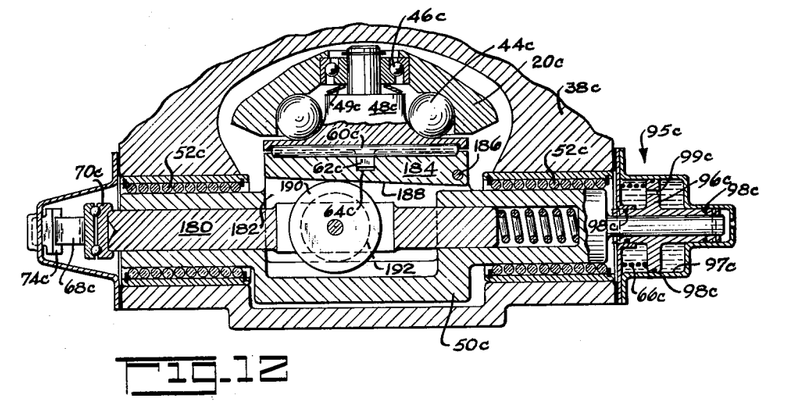
FIG. 12 is a sectional view taken along line 12—12 of FIG. 11.

However, instead of using said force, derived from the hydraulic control pressure, to axially load the toroidal discs against the rollers such a force may be applied directly against each roller along the axis of its spindle to urge said roller into contact with the toroidal discs. With this latter mode of loading the transmission rollers into contact with the toroidal discs, the contact pressure between each roller and the toroidal discs depends only on the magnitude of said loading force independently of the speed-ratio position of the rollers. Such an arrangement is illustrated in FIGS. 11–12. For ease of understanding, the parts of FIGS. 11 and 12 corresponding to parts of FIGS. 1–5, have been designated by the same reference numerals but with a subscript $c$. FIG. 11 illustrates the transmission in axial section and is generally similar to FIGS. 1 and 6 except the axial loading piston 100 (FIG. 1) or 100a (FIG. 6) has been eliminated in FIG. 11 since it is not needed and both toroidal discs 16c and 18c are rigidly supported against any tilting relative to the transmission axis. Also in the transmission of FIGS. 11–12, as in that of FIG. 6, a cam and sprag device preferably is provided in both the input and in the output side of the transmission. As illustrated in FIG. 11, the cam and sprag device 130c on the input side of the transmission and the cam and sprag device 162c on the output side are both similar to the cam and sprag device 162 of FIG. 6. Hence the input side of the transmission includes an intermediate shaft 179 which is rigidly secured to the input toroidal disc 16c. The intermediate input shaft 179 is equivalent to the intermediate output shaft 170 previously described in connection with FIG. 6.

In the transmission of FIGS. 11–12 each roller 20c and its spindle 48c is urged inwardly toward the transmission axis in a direction along the axis of its spindle by a force derived from the hydraulic control pressure which controls the speed-ratio position of each roller. For this purpose the pivot shaft 50c of each roller has a pin 180 slidable therein. The enlarged central portion of the pivot shaft 50c has a slot 182 and a cam member 184 is pivotally supported within the slot by a hinge element 186 disposed adjacent to one end of said slot. The outer side of the member 184 has an inclined cam surface 188 engaged by a cam follower roller 190 carried by a bifurcated portion of the pin 180 and said pin also has rollers 192 engaging the bottom of the slot 182.

The pin 60c interconnecting each roller 20c with its pivot shaft 50c is received within facing grooves in the roller spindle 48c and in the cam member 184 carried by said pivot shaft. Also, the spindle 48c has lugs 62c which are received in a cross slot 64c in said cam member 184.

The lever 68c applies the controllable hydraulic pressure force through the thrust bearing 70c to the pin 180 slidable within the associated pivot shaft 50c. This pin 180 through its cam follower 190 exerts a force against the cam surface 188. Because of the inclination of the cam surface 188 to the axis of the associated pivot shaft 50c, said force has a component parallel to the axis of the pivot shaft 50c for balancing the traction forces on the associated roller. The rollers 192 merely serve to support the pin 180 against the load applied by the cam 184. Each cam follower 190 also tends to swing the engaged cam element 184 about its hinge 186 to apply a force inwardly against and substantially parallel to the axis of the associated roller spindle 48c thereby pressing each roller inwardly against the toroidal discs. Because of the pins 60c, each roller 20c automatically applies equal contact force against both toroidal discs 16c and 18c. This roller contact force obviously is derived from the hydraulic control pressure applied to the shaft by 50c by the lever 68c through the cam follower 190 for controlling the speed-ratio position of each roller. The proportionality ratio of this derived force and the speed-ratio control force obviously depends on the slope of the cam surface 188. Since this force loading the rollers 20c against the toroidal discs 16c and 18c is applied in a direction parallel to the roller axis, the ratio of said force and the actual contact pressure between said rollers and toroidal discs is a constant which is independent of the speed ratio position of the rollers. Accordingly the embodiment of FIGS. 11–12 not only does not require the axial loading piston 100 but also does not require means, such as the valve 116, to vary the proportionality between the controllable hydraulic pressure and the hydraulic pressure loading the rollers 20 against the toroidal discs.

The spring 194 merely serves to maintain the pin 180 and its thrust bearing 70c in contact with the lever 68c. Also the right end (as viewed in FIG. 10) of each pivot shaft 50c preferably has a dash-pot device 95c and a spring 94c similar to the corresponding parts illustrated in FIG. 2.

Figure 13:
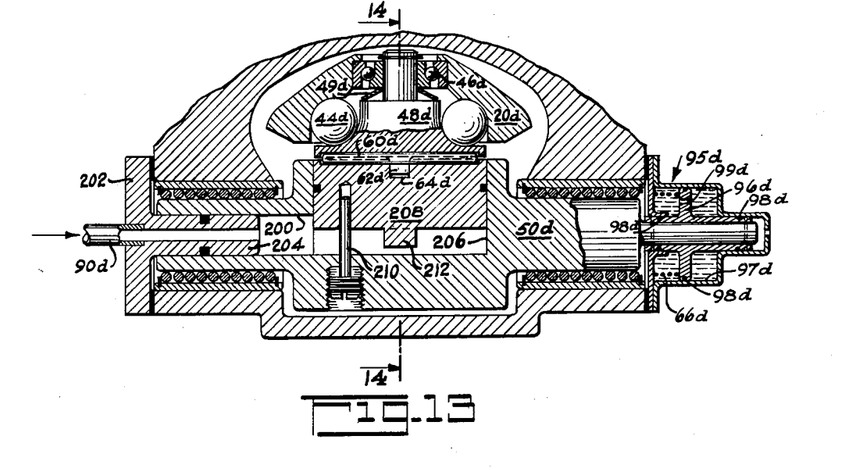
FIG. 13 is a view similar to FIG. 12 but showing a further modification.
Figure 14:
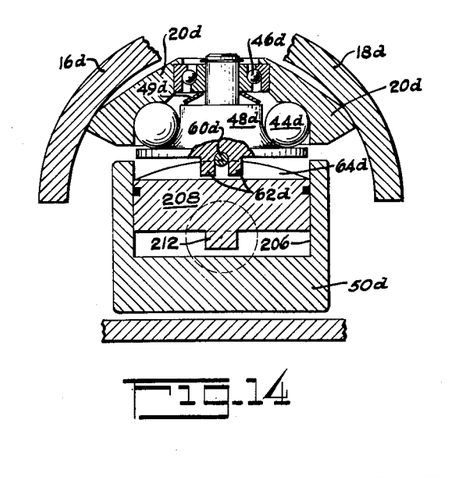
FIG. 14 is a sectional view taken along line 14—14 of FIG. 13.

In FIGS. 11–12 a mechanical cam and cam follower arrangement is provided for loading each roller in a direction along its spindle axis into contact with the toroidal surfaces. FIGS. 13–14 illustrate an arrangement for accomplishing this function hydraulically. The transmission of FIGS. 13–14 is otherwise like that of FIGS. 11–12. Again for ease of understanding, the parts of FIGS. 13–14 have been designated by the same reference numerals as the corresponding parts of FIGS. 11–12 but with a subscript $d$.

In FIGS. 13–14 each roller pivot shaft 50d has a bore 200 at one end to which the controllable hydraulic pressure is applied directly by the line 90d through a fixed plate 202 having a tubular portion 204 extending into said bore 200 such that the shaft 50d can move axially relative to said tubular extension. The central portion of each pivot shaft 50c is enlarged and has a relatively large cross bore 206 meeting the bore 200. A piston 208 is slidable in the cross bore 206 and each roller 20d is connected to its pivot shaft 50d by lugs 62d received in a cross slot 64d in said piston and by the pin 60d received within facing grooves in the roller spindle 48d and said piston. Suitable means such as one or more guide pins 210 are provided to prevent rotation of each piston 208 about its axis. The right end (as viewed in FIG. 13) of each pivot shaft 50d preferably has a dash pot device 95d similar to the corresponding parts illustrated in FIG. 2.

Each piston 208 has a projection 212 to limit its radially outward travel under the action of the preload spring 148, 148a or 148c of FIGS. 1, 6 or 11 respectively. In lieu of such a pre-load spring each piston 208 could be provided with its own pre-load spring (not shown) under compression between the piston and the bottom of its bore 206.

With this structure of FIGS. 13–14 the hydraulic control pressure exerts an axial control force on each roller pivot shaft 50d proportional to the magnitude of said pressure and the area of the bore 200 while the force loading each roller 20d inwardly against the toroidal surfaces is proportional to the magnitude of said pressure and the area of the piston 208. It is apparent, therefore, that the force loading the rollers 20d against the toroidal surfaces is derived from and is proportional to the hydraulic control pressure which controls the speed ratio position of the rollers.

It is not essential that the axis of the piston 208 be disposed as illustrated at right angles to the axis of its pivot shaft 50d. If desired the axis of the piston 208 may be inclined somewhat to the axis of its pivot shaft 50d to minimize side loading of the piston against the wall of its bore 206.

While I have described my invention in detail in its present preferred embodiment, it will be obvious to those skilled in the art, after understanding my invention that various changes and modifications may be made therein without departing from the spirit or scope thereof. I aim in the appended claims to cover all such modifications.

I claim as my invention:

1. A variable speed transmission comprising co-axial input and output members having facing toric surfaces; a plurality of circumferentially-spaced rollers disposed between and in driving contact with said surfaces for transmitting torque from the input member to the output member; support means for each roller including pivot means providing for speed-ratio-changing pivotal movement of said roller across said toric surfaces; each roller support means also including means providing for movement of its roller in a second mode in response to changes in the traction forces between said roller and said toric surfaces such that in response to movement in said second mode said speed-ratio-changing pivotal movement of the roller is initiated; means including a source of controllable fluid pressure operatively connected to each roller to subject each roller to a control force opposing said traction forces such that each roller automatically moves to a speed-ratio position in which the forces thereon are in balance; at least one of said input and output members including rotatable cam means connected in series therewith so that the torque transmitted by said one member is effective through said cam means to urge the toric surfaces of said members axially against said rollers; and means providing a force derived from said controllable fluid pressure and effective to load said toric surfaces and rollers into contact with each other independently of the toroque transmitted by said one member.

2. A variable speed transmission as claimed in claim 1 and in which said roller and toric surface loading means includes means for axially loading the input and output members toward each other into contact with said rollers with a force derived from said controllable fluid pressure.

3. A variable speed transmission as claimed in claim 2 and including means for increasing the ratio of said axial loading force to said controllable fluid pressure upon speed-ratio-changing movement of the rollers in a direction for increasing the speed of the output member relative to the input member.

4. A variable speed transmission as recited in claim 2 and including means for supporting one of said input and output members for tilting freedom relative to the transmission axis for equalizing the contact pressure of the toric surface of said one of the input and output members on the rollers.

5. A variable speed transmission as claimed in claim 1 and in which said last mentioned means includes a piston and cylinder assembly having relatively movable piston and cylinder elements, and means for supplying a second fluid pressure thereto derived from said controllable fluid pressure, said piston and cylinder assembly being operatively connected to said members so that said second pressure is effective to axially urge the toric surfaces of said members against said rollers.

6. A variable speed transmission as claimed in claim 5 and in which said cam means includes a pair of axially-spaced relatively-rotatable cam elements and roller elements disposed between said cam elements for transmitting torque from one cam element to the other and in which the movable element of said piston and cylinder assembly is operatively connected to one of said input and output members through said cam means for transmitting the fluid pressure force of said piston to said one member.

7. A variable speed transmission as claimed in claim 6 and in which said movable element of the piston and cylinder assembly is annular and is co-axial with said one member and including bearing means supporting said one member on said movable element.

8. A variable speed transmission as claimed in claim 1 and in which said roller and toric surface loading means includes means for moving each roller into contact with said toric surfaces with a force derived from said controllable fluid pressure.

9. A variable speed transmission as claimed in claim 1 and in which each roller is disposed radially inwardly of the axis of its said pivot means and said roller and toric surface loading means includes means for urging each roller inwardly along its axis of rotation into contact with said toric members with a force derived from said controllable fluid pressure.

10. A variable speed transmission as claimed in claim 1 in which each roller support includes a spindle on which said roller is journaled, with said spindle being supported by its said roller pivot means so that the spindle axis is disposed at right angles to the axis of said roller pivot means and the spindle with its roller is movable in a direction generally parallel to its axis relative to the axis of said pivot means, and in which said roller and toric surface loading means includes means carried by each roller pivot means for applying a force, derived from said controllable pressure, against the associated roller spindle in a direction generally parallel to the spindle axis for loading its roller into contact with said toric surfaces.

11. A variable speed transmission as claimed in claim 10 and in which the force applying means carried by each pivot means includes cam means subjected to said controllable fluid pressure for applying said roller loading force to said spindle.

12. A variable speed transmission as claimed in claim 11 and in which each said cam means is also effective to apply said control force to its associated roller pivot means.

13. A variable speed transmission as claimed in claim 10 and in which the force applying means carried by each pivot means includes a piston movable laterally relative to the axis of its roller pivot means and on which the associated roller spindle is carried.

14. A variable speed transmission as claimed in claim 13 and in which each said piston is subjected to a pressure proportional to said controllable fluid pressure.

15. A variable speed transmission as claimed in claim 1 and in which said cam means includes a pair of axially-spaced relatively rotatable cam elements each having a plurality of circumferentially-spaced generally V-shaped cam recesses facing corresponding V-shaped cam recesses in the other of said cam elements and a cam roller element disposed between each facing pair of said recesses in engagement with the surface of each said cam recess, the bottom of each said cam recess having a radius of curvature which is substantially greater than the radius of curvature of the engaging surface of the cam roller element received within said cam recess.

16. A variable speed transmission as claimed in claim 15 and in which said cam roller elements are barrel-shaped and said cam recesses are formed so that said cam roller elements are urged radially inwardly by the load transmitted by said cam and cam roller elements.

17. A variable speed transmission as claimed in claim 16 and including a floating member engageable with the ends of said barrel-shaped cam roller elements.

18. A variable speed transmission as claimed in claim 15 and in which the bottom of each cam recess is a straight line disposed radial relative to the transmission axis and said cam recess has a profile which is generated by motion of said line parallel to itself.

19. A variable speed transmission as claimed in claim 18 and in which said cam roller elements are barrel-shaped and in which said cam means includes a floating member engageable with the inner ends of said barrel-shaped cam elements.

20. A variable speed transmission as claimed in claim 15 and including second cam means similar to said first mentioned cam means and interposed in series with the other of said members.

21. A variable speed transmission as claimed in claim 15 and in which each said cam roller element is conical and has its generating elements meeting at a point disposed substantially on the axis of said transmission and in which said cam means includes a floating annular member engaging the outer ends of said conical roller elements.

22. A variable speed transmission as recited in claim 15 and in which one of said cam elements is rigid with one of said toric members and the associated cam roller elements provide for tilting freedom of said one toric member relative to the transmission axis for equalizing the contact pressure of said toric member on the rollers.

23. A transmission comprising co-axial input and output members having facing toric surfaces; a plurality of circumferentially-spaced rollers disposed between and in driving contact with said surfaces for transmitting torque from the input member to the output member, and rotatable cam means connected in series with one of said members; said cam means including a pair of axially-spaced cam elements each having a plurality of circumferentially-spaced V-shaped cam recesses facing corresponding V-shaped cam recesses in the other of said cam elements, and a cam roller disposed between each facing pair of said cam recesses and having a barrel-shaped surface in engagement with the surfaces of said recesses, the profile of each cam recess being such that, at least when the cam rollers are displaced from the bottoms of their respective cam recesses, the two surfaces of a facing pair of cam recesses converge toward each other in a radially outward direction when viewed in a plane including the transmission axis and passing thru the cam roller disposed between said pair of cam recess.

24. A transmission comprising co-axial input and output members having facing toric surfaces; a plurality of circumferentially-spaced rollers disposed between and in driving contact with said surfaces for transmitting torque from the input member to the output member, and rotatable cam means connected in series with one of said members; said cam means including a pair of axially-spaced cam elements each having a plurality of circumferentially-spaced V-shaped cam recesses facing corresponding V-shaped cam recesses in the other of said cam elements, and a cam roller disposed between each facing pair of said cam recesses and having a barrel-shaped surface in engagement with the surfaces of said recesses, each V-shaped cam recess having a profile such that its extreme bottom is substantially a straight line lying in a plane including the transmission axis and the remainder of said profile is generated by said line moving parallel to itself.

25. A variable speed transmission comprising co-axial input and output members having facing toric surfaces; a plurality of circumferentially-spaced rollers disposed between and in driving contact with said surfaces for transmitting torque from the input member to the output member; a spindle for each roller on which its roller is journaled, the axis of each spindle lying substantially in a plane including the transmission axis; a pivot shaft for each roller disposed radially outwardly of its associated roller relative to the transmission axis and having its axis lying in a plane disposed between said toric surfaces, each said pivotal shaft being mounted for rotational movement about its axis and for limited movement along its axis and each pivot shaft and the associated roller spindle having a pair of facing semi-circular grooves running parallel to the axis of said pivot shaft; a cylindrical pin received within each facing pair of said semi-circular grooves for interconnecting said roller spindle and pivot shaft for speed-ratio-changing movement of the associated roller about this axis of said pivot shaft and for limited movement of said roller about the axis of said pin for equalizing the contact pressures of said roller on said toric surfaces, each said pivot shaft and associated roller spindle also having engaging surfaces such that axial motion of said pivot shaft results in motion of said roller spindle and its roller in the same direction; and means for applying a control force to each said pivot shaft urging said pivot shaft in a direction along its axis in opposition to the traction forces exerted by said toric surfaces on the associated roller.

26. A variable speed transmission as claimed in claim 25 and in which said engaging surfaces on each associated roller spindle and pivot shaft comprises an inter-engaging tongue and groove formation with said groove extending at right angles to the axis of said pivot shaft, to permit limited rotational movement of said roller spindle about the axis of the cylindrical pin interconnecting said spindle and pivot shaft.

27. A variable speed transmission as claimed in claim 26 and in which said control force applying means includes means for imposing a controllable fluid pressure force axially against each pivot shaft.

28. A variable speed transmission as claimed in claim 25 and including a pair of bearings on each spindle for rotatably supporting its roller thereon, each said bearing being arranged to function as a thrust bearing for resisting movement of its roller along said spindle in a direction radially outward relative to the transmission axis; and a spring carried by each spindle for transmitting thrust forces from the associated roller through one of said bearings to the spindle.

29. A variable speed transmission comprising coaxial input and output members having facing toric surfaces; a plurality of circumferentially-spaced rollers disposed between and in driving contact with said surfaces for transmitting torque from the input member to the output member; a spindle for each roller on which its roller is journaled, the axis of each spindle lying substantially in a plane including the transmission axis; a pivot shaft for each roller disposed radially outwardly of its associated roller relative to the transmission axis; means supporting each roller spindle on the associated pivot shaft for speed-ratio-changing movement of its roller about the axis of said pivot shaft; a pair of bearings on each spindle for rotatably supporting its roller thereon, each said bearing being arranged to function as a thrust bearing for resisting movement of its roller along said spindle in a direction radially outward relative to the transmission axis; and a spring carried by each spindle for transmitting thrust forces from the associated roller through one of said bearings to the spindle.

30. A variable speed transmission as claimed in claim 29 and in which one bearing of each said pair of bearings is substantially smaller than the other and said spring is disposed between the smaller bearing and the associated spindle, each said spring being a Belleville washer type spring.

References Cited in the file of this patent

UNITED STATES PATENTS

| 1,698,229 | Hayes | Jan. 8, 1929 |
|---|---|---|
| 2,201,176 | Hayes | May 21, 1940 |
| 2,748,614 | Weisel | June 5, 1956 |
| 2,959,063 | Perry | Nov. 8, 1960 |